April 5, 1966  D. A. BOSSEN  3,244,206
CONTROL APPARATUS FOR A VENEER LATHE
Filed March 8, 1963
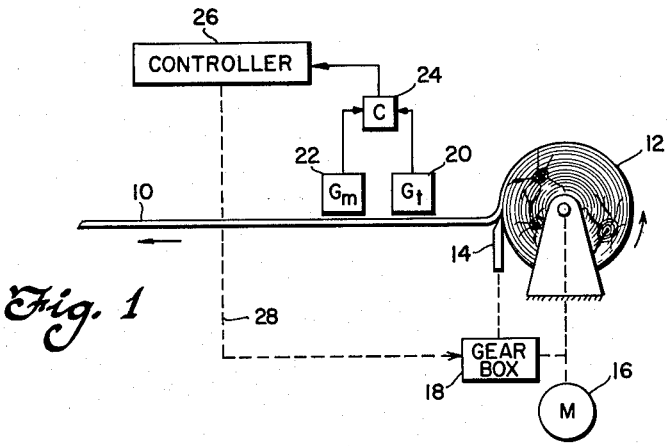
Fig. 1
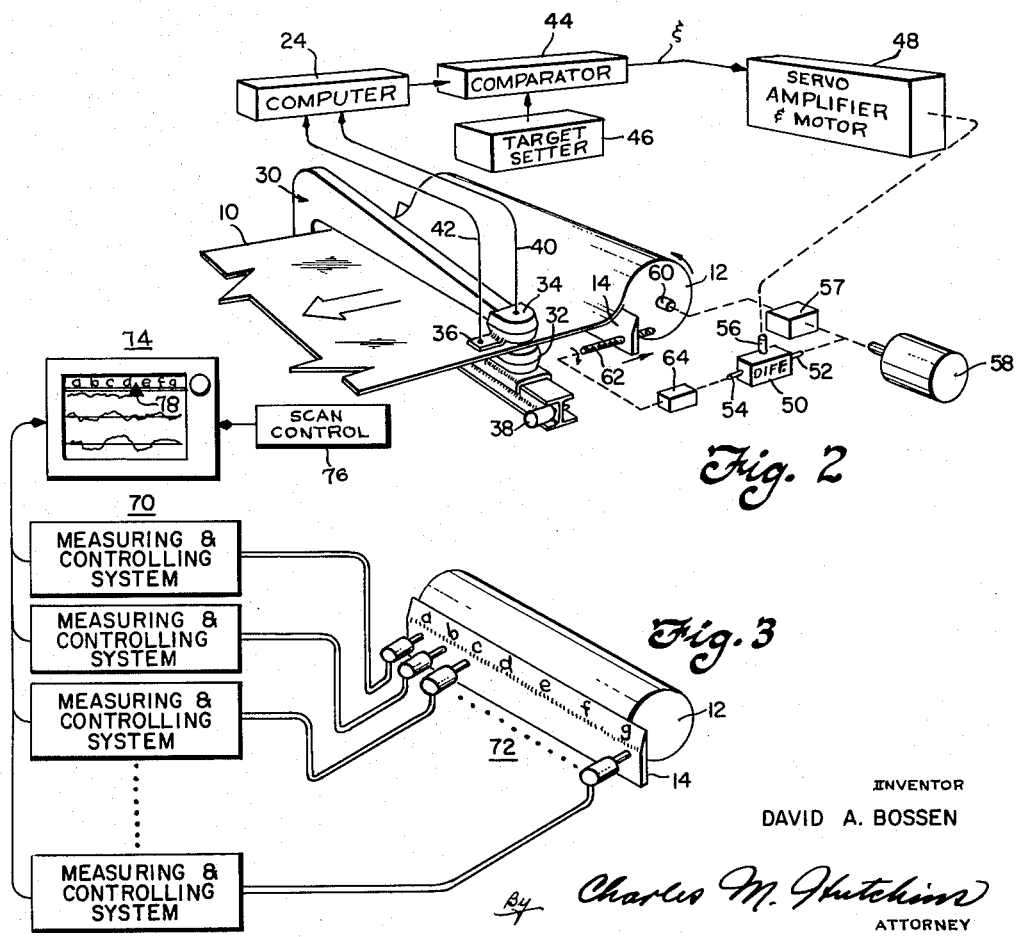
Fig. 2
Fig. 3
INVENTOR
DAVID A. BOSSEN
By Charles M. Hutchins
ATTORNEY United States Patent Office 3,244,206
Patented Apr. 5, 1966

3,244,206
CONTROL APPARATUS FOR A VENEER LATHE
David A. Bossen, Columbus, Ohio, assignor to Industrial
Nucleonics Corporation, a corporation of Ohio
Filed Mar. 8, 1963, Ser. No. 263,860
8 Claims. (Cl. 144—209)

This invention relates generally to plywood manufacturing processes and more particularly to an improved method and means for measuring and controlling the thickness of veneer.

In the construction of plywood, sheets of veneer are bonded together. The veneer is produced by peeling a rotating moist log with a knife. As the log rotates, the peripherally mounted knife and the log are moved closer together to provide a continuous sheet. However, due to the varying moisture content of the sheet, it has been difficult to measure the thickness thereof. Continuous mechanical thickness gauge measurements are not suitable because of the moisture-induced swelling. Noncontacting radiation gauges have heretofore been unsuccessful due to wide fluctuations in moisture content.

The present invention overcomes these disadvantages by compensating the total weight per unit area measurements provided by a beta radiation gauge with the moisture percentage measurements of a moisture detector. From the product of these measurements, a signal proportional to bone dry weight per unit area and sheet thickness is derived. The relative separation between the log and the knife is adjusted in accordance with the derived signal to produce a sheet of substantially uniform thickness.

Accordingly, it is a primary object of the present invention to provide a thickness measuring and control system for a veneer manufacturing process.

It is another object of the present invention to provide a veneer thickness measuring and controlling system which is relatively simple in operation.

It is also an object of the present invention to provide a veneer thickness measuring and controlling system which is readily adjustable to processes already in existence.

These and other objects of the present invention will become more apparent from the following description taken in conjunction with the drawings, in which:

FIG. 1 is a diagrammatic view of the measuring and controlling system of the present invention;

FIG. 2 is a perspective view of the system shown in FIG. 1; and

FIG. 3 is a perspective view partly diagrammatic of a modification of the system shown in FIG. 1.

With reference to the drawings and particularly to FIG. 1, a continuous sheet of veneer 10 is produced by peeling a rotating log 12 with a knife 14 extending along the long dimension thereof. A motor 16 drives the log at a substantially constant angular velocity and through appropriate gearing at 18 continuously moves the knife 14 closer to the center of revolution. The knife moves a distance equal to the desired thickness of the veneer during one revolution of the log 12. Alternatively, the knife may be held stationary and the log moved toward it.

To measure the thickness of veneer, the present invention provides a pair of gauges 20 and 22. Gauge 20 measures the total weight per unit area of veneer stripped by the knife 14 by means of known bremsstrahlung or X-radiation absorption techniques described in U.S. Patent 2,829,268 issued April 1, 1958 to H. R. Chope and 2,933,606 issued April 19, 1960 to G. B. Foster et al. Gauge 22 measures only the moisture percentage of the sheet and may be similar to the gauge described in the copending application Serial No. 41,975, filed July 11, 1960 by Albert F. Hanken, now Patent No. 3,155,900 issued Nov. 3, 1964. A computer 24 computes the product of the two measurements and subtracts it from the total weight per unit area to provide a control signal representative of the weight per unit area of moisture-free veneer. Since the density of the veneer remains substantially constant, the magnitude of the control signal will depend only on the thickness of the veneer 10.

This control signal energizes a controller 26 which is mechanically coupled as indicated by the dotted line 28 to the gearing 18 of the knife 14. Controller 26 may be either of the reset type shown and described in U.S. Patent No. 2,895,888, issued July 21, 1959, to Donald E. Varner, or of the continuous type well known to those skilled in the art. Controller 26 adjusts the magnitude of lateral displacement of the knife 14 per revolution of the log 12 in the manner described hereinafter.

Referring to FIG. 2, the measuring gauges 20 and 22 may be mounted on a U-bracket 30 having an upper and a lower arm embracing the veneer sheet 10. At the ends of the arms are carried a lower radiation source housing 32 and an upper detector housing 34. Attached to the upper housing 34 is a shoe 36 which contains suitable moisture-sensitive elements and is carried near to the veneer sheet 10. The bracket may be fixed to provide a single point measurement of the veneer or it may be movable by means of a traversing motor 38. Conductors 40 and 42 couple the outputs on lines 40 and 42 of the transducer elements located at 34 and 36 respectively to the computer 24.

A comparator 44 compares the computed dry veneer weight per unit area with a desired value for the same generated by a target setter 46. Any differences between the two values comprises an error signal $\xi$.

In response to the error signal $\xi$, a servo amplifier and motor unit 48 is operative to adjust a mechanical differential 50 having an input shaft 52, an output shaft 54 and a control shaft 56. A constant speed motor 58 drives the differential 50 and a gear reduction unit 57. The output of the gear reduction unit 57 is coupled to an axle 60 driven into the center of the log 12. Output shaft 54 of the differential is coupled to a screw 62 threadingly engaging the blade 14 by means of a gear box 64. The blade may be supported by guide rods (not shown). As the screw 62 is rotated, the blade 14 is displaced toward the log as shown by the arrow. The speed of shaft 54 relative to shaft 52 determines the distance of knife travel per revolution of the log 12. And the control shaft 56 adjusts the ratio of the two speeds in a manner well known to those skilled in the art.

In the operation of the system, an increase in the computed dry weight per unit area of veneer causes the servo system at 48 to adjust the angular position of control shaft 56 to decrease the speed of output shaft 54 relative that of shaft 52. As a result, the knife 14 slices off a somewhat thinner sheet of veneer. Any increase in veneer weight per unit area is corrected by increasing the speed of shaft 54 relative that of shaft 52 by means of the control shaft 56. The resulting veneer 10 is produced with substantially the weight per unit area set in at 46.

Referring now to FIG. 3, it may be desirable to perform localized adjustments of the width-wise thickness dimension of the veneer 10. To this end, a plurality of measuring and controlling systems 70 may be provided for several cross-sheet regions of the veneer. Each of the systems may be coupled to a hydraulic actuator assembly 72 connected to the blade 14. With this arrangement, the blade may be locally warped to produce a sheet either of substantially uniform thickness or of any other desired profile.

Instead of constructing a plurality of measuring systems, it may be preferable to scan the veneer sheet 10 and control the blade warping adjustments in accordance with the average thickness of the successively scanned regions. Reference may be had to U.S. Patent No. 2,909,660, issued to Frank M. Alexander for apparatus to perform this function.

It may be desirable to provide a permanent record of how the dry weight per unit area of the processed plywood varies across the sheet. To this end, the measurements of each of the gauges at 70 are coupled into a chart recorder 74. A scanning control circuit 76 serves to drive the recording pen 78 across the chart past the scale positions labeled *a–g,* for example, corresponding to the cross-sheet positions *a–g.* The scanning control unit 76 also serves to select the output signals of the measuring circuits 70 and apply it to the chart drive mechanism of the recorder 74. This technique is described in greater detail in the above cited patent to F. M. Alexander. The resultant trace is an *x–y* profile of the cross-sheet dry weight dimension.

Although certain and specific embodiments have been shown, modifications may be made thereto without departing from the true spirit and scope of the invention.

I claim:

1. In a plywood manufacturing device wherein a log of variable moisture content is rotated at a predetermined angular velocity about its longitudinal axis and a peripherally mounted knife blade is positioned along the longitudinal dimension of the log for stripping off a continuous sheet of veneer, the improvement comprising a first gauge positioned adjacent said veneer emanating from said knife for measuring the wet weight per unit area of said veneer, a second gauge positioned adjacent said first gauge for measuring the moisture weight per unit area of said veneer, circuit means utilizing said measurements for computing the dry weight per unit area of said veneer, adjustable means for displacing said knife toward said longitudinal axis during said rotation to provide a sheet of thickness equal to the amount of said displacement occurring per revolution of said log, and control means for adjusting said knife displacement means in accordance with said computed dry weight per unit area of said veneer.

2. In a plywood manufacturing device wherein a log of variable moisture content is rotated at a predetermined angular velocity about its longitudinal axis and a peripherally mounted knife blade is positioned along the longitudinal dimension of the log for stripping off a continuous sheet of veneer, the improvement comprising a first gauge positioned adjacent said veneer emanating from said knife for measuring the wet weight per unit area of said veneer, a second gauge positioned adjacent said first gauge for measuring the moisture weight per unit area of said veneer, circuit means utilizing said measurements for computing the dry weight per unit area of said veneer, means for establishing a desired value for said dry weight per unit area, means for comparing said computed value of veneer weight per unit area with said established desired value therefor to derive an error signal, adjustable means for displacing said knife toward said longitudinal axis during said rotation to provide a sheet of thickness equal to the amount of said displacement occurring per revolution of said log, and control means for adjusting said knife displacement means in accordance with the magnitude of said error signal.

3. In a plywood manufacturing device wherein a log of variable moisture content is rotated at a predetermined angular velocity about its longitudinal axis and a peripherally mounted knife blade is positioned along the longitudinal dimension of the log for stripping off a continuous sheet of veneer, the improvement comprising means for measuring the dry weight per unit area of said moist veneer at discrete regions across said sheet, a plurality of adjustable means for locally displacing said knife at points along said longitudinal dimension corresponding to each of said discrete regions toward said axis of rotation to provide a sheet having a width-wise thickness profile in accordance with said local knife displacements, and means for adjusting each of said knife displacement means in accordance with the dry weight per unit area measurement of said corresponding measuring means.

4. In a plywood manufacturing device wherein a log of variable moisture content is rotated at a predetermined angular velocity about its longitudinal axis and a peripherally mounted knife blade is positioned along the longitudinal dimension of the log for stripping off a continuous sheet of veneer, the improvement comprising a plurality of means for measuring the dry weight per unit area of said moist veneer at discrete regions across said sheet, a plurality of adjustable means for locally displacing said knife at points along said longitudinal dimension corresponding to each of said discrete regions toward said axis of rotation to provide a sheet having a width-wise thickness profile in accordance with said local knife displacements, and means for adjusting each of said knife displacement means in accordance with the dry weight per unit area measurement of said corresponding measuring means, a recorder, and scanning control means connected between said plurality of measuring means and said recorder for graphically displaying each of said dry weight per unit area measurements in accordance with the widthwise position across said sheet corresponding to said measurement.

5. Control apparatus for producing a uniform sheet from a member having a variable moisture content, comprising:
   knife means for stripping said sheet therefrom,
   means for providing relative movement between said knife means and said member,
   gauge means for providing a signal that is proportional only to the dry weight per unit area of said moist sheet, and
   means responsive to said dry weight per unit area signal for controlling said movement means to provide a sheet having a uniform weight per unit area after drying.

6. Control apparatus for producing a uniform sheet of veneer from a log of variable moisture content, comprising:
   means for rotating said log,
   knife means laterally displaceable toward said log for stripping off said sheet,
   dry weight gauging means including
      means for measuring the total weight per unit area of said sheet,
      means for measuring the moisture content of said sheet and
      computer means for combining said measurements to provide a signal that is proportional to the dry weight per unit area of said sheet, and
   controller means for adjusting the lateral displacement of said knife in accordance with said signal to provide a sheet having a dry uniform weight per unit area.

7. Apparatus for producing a uniform sheet from a member having a variable moisture content, comprising:
   a knife extending along the length of said member to strip off said sheet,
   means for providing relative movement between said knife means and said member,
   means for measuring the dry weight per unit area of said moist sheet at discrete regions across said sheet,
   means for locally displacing said knife at points along the length thereof corresponding to said discrete regions to provide a sheet having a widthwise thickness profile in accordance with said local knife displacements, and
   means for adjusting said knife displacement means in accordance with the dry weight per unit area measurement of said measuring means to provide a sheet having a uniform weight per unit area across the width after drying.

8. Plywood sheet apparatus for producing a uniform sheet of veneer from a log of indeterminate moisture content, comprising:
- means for rotating said log about the longitudinal axis thereof,
- a knife extending along the length of said log to strip off said sheet of veneer,
- a plurality of means for measuring the dry weight per unit area of said moist sheet at discrete regions across said sheet,
- a plurality of adjustable means for locally displacing said knife at points along the length thereof corresponding to said discrete regions to provide a sheet having a widthwise thickness profile in accordance with said local knife displacements,
- means for adjusting each of said knife displacement means in accordance with the dry weight per unit area measurement of said measuring means,
- a recorder, and
- scanning control means connected between said plurality of measuring means and said recorder for graphically displaying each of said dry weight per unit area measurements in accordance with the widthwise position across said sheet corresponding to said measurement.

References Cited by the Examiner

UNITED STATES PATENTS

| | | | |
|---|---|---|---|
| 1,611,896 | 12/1926 | Dike | 144—209 |
| 1,877,013 | 9/1932 | Moore | 144—209 |
| 2,527,208 | 10/1950 | Berry et al. | 73—73 |
| 2,534,671 | 12/1950 | Haumann | 144—209 |
| 2,829,268 | 4/1958 | Chope | 250—83.4 |
| 2,895,888 | 7/1959 | Varner | 250—83.4 |
| 2,909,660 | 10/1959 | Alexander | 250—52 |
| 2,920,206 | 1/1960 | Heller | 250—83.4 |
| 2,933,606 | 4/1960 | Foster et al. | 250—83.4 |
| 2,966,628 | 12/1960 | Bosch | 250—83.4 |
| 3,073,153 | 1/1963 | Petitjean | 73—73 |
| 3,130,733 | 4/1964 | Martin | 250—83.30 |

ROBERT C. RIORDON, *Primary Examiner.*

WILLIAM W. DYER, JR., LESTER M. SWINGLE,
*Examiners.*